United States Patent
Lien et al.

(10) Patent No.: US 10,640,421 B2
(45) Date of Patent: May 5, 2020

(54) USAGE OF FLY ASH FROM FLUE GAS DESULFURIZATION TO MAKE COMPOSITIONS FOR BUILDING

(71) Applicants: Chin-Tien Lien, Taichung (TW); Chien-Fan Lien, Taichung (TW)

(72) Inventors: Chin-Tien Lien, Taichung (TW); Chien-Fan Lien, Taichung (TW)

( * ) Notice: Subject to any disclaimer, the term of this patent is extended or adjusted under 35 U.S.C. 154(b) by 258 days.

(21) Appl. No.: 15/668,651

(22) Filed: Aug. 3, 2017

(65) Prior Publication Data
US 2018/0037499 A1   Feb. 8, 2018

(30) Foreign Application Priority Data
Aug. 4, 2016   (TW) .............. 105124724 A

(51) Int. Cl.
| | | |
|---|---|---|
| *C04B 28/14* | (2006.01) | |
| *C04B 11/00* | (2006.01) | |
| *C04B 11/06* | (2006.01) | |
| *C04B 28/16* | (2006.01) | |
| *C04B 7/00* | (2006.01) | |
| *C04B 7/34* | (2006.01) | |
| *C04B 28/00* | (2006.01) | |
| *C04B 32/00* | (2006.01) | |
| *C04B 9/04* | (2006.01) | |
| *C04B 111/60* | (2006.01) | |
| *C04B 111/00* | (2006.01) | |
| *C04B 111/28* | (2006.01) | |
| *C04B 103/10* | (2006.01) | |

(52) U.S. Cl.
CPC ............ *C04B 11/06* (2013.01); *C04B 11/005* (2013.01); *C04B 28/145* (2013.01); *C04B 28/165* (2013.01); *C04B 2103/10* (2013.01); *C04B 2111/0062* (2013.01); *C04B 2111/28* (2013.01); *C04B 2111/60* (2013.01); *Y02W 30/92* (2015.05)

(58) Field of Classification Search
USPC .......................... 106/638, 772, 775
See application file for complete search history.

(56) References Cited

U.S. PATENT DOCUMENTS

| | | | | |
|---|---|---|---|---|
| 5,488,991 A | * | 2/1996 | Cowan | ............... C04B 24/243 |
| | | | | 106/696 |
| 7,247,284 B1 | * | 7/2007 | Seck | ................. C01D 1/20 |
| | | | | 23/304 |
| 2011/0083556 A1 | * | 4/2011 | Duesel, Jr. | ............ B01D 1/14 |
| | | | | 95/158 |
| 2014/0272376 A1 | * | 9/2014 | Aldabaibeh | ............ C04B 38/10 |
| | | | | 428/312.4 |

FOREIGN PATENT DOCUMENTS

| | | | | | |
|---|---|---|---|---|---|
| CN | 101475326 A | * | 7/2009 | | |
| CN | 102432073 A | * | 5/2012 | | |
| CN | 105117080 A | * | 12/2015 | | |
| CN | 106145725 A | * | 11/2016 | | |
| CN | 108117080 A | * | 6/2018 | | |
| JP | 62254824 A | * | 11/1987 | ............ | B01J 20/041 |
| JP | 63296827 A | * | 12/1988 | | |

* cited by examiner

*Primary Examiner* — James E Mcdonough

(57) ABSTRACT

Composition for building materials comprises of fly ash from flue gas desulfurization. The fly ash (β $CaSO_4$ anhydrite), obtained from circulating fluidized bed flue gas desulfurization, is mixed with binder reactants at a ratio of 9:1. It's mainly used for non-structural cement mortar, bricks for paving walkways, brick wall decors, fire-resistant walls for interior partitions, plasterboards and so on. The binder reactants compose of 70% $CaSO_4 \cdot \frac{1}{2}H_2O$, 10% $Na_2SO_4$, 10% CaO, 5% NaOH, 0~5% cement and 0~5% starch. When the binder reactants are mixed with fly ash and water (30% to 40% of the above total weight), the hydration process of $CaSO_4$ anhydrite is accelerated.

3 Claims, No Drawings

USAGE OF FLY ASH FROM FLUE GAS DESULFURIZATION TO MAKE COMPOSITIONS FOR BUILDING

CROSS-REFERENCE TO RELATED APPLICATIONS

This application claims the benefit of Taiwan Invention Patent Application No. TW 105124724 filed Aug. 4, 2016, which is hereby incorporated by reference.

BACKGROUND OF THE INVENTION

(1) Field of Invention

This invention relates to a reuse of abandoned fly ash, specifically focusing on fly ash from flue gas desulfurization to make compositions for building materials.

(2) Description of Related Art

Formosa Plastics Corporation (FPC) Sixth Naphtha Cracker Complex uses Circulating Fluidized Bed (CFB) Boiler from ALSTOM. Petroleum coke and limestone are mixed with a ratio of 2:1 and sent inside the boiler, undergoing high temperature oxidative combustion to generate steam and drive turbines. Hundreds of tons of by-product fly ash, composed of pulverized β $CaSO_4$ anhydrite, granular β $CaSO_4$ anhydrite and hydrated $CaSO_4$, are produced daily and have not been effectively dealt with. Since the fly ash is produced at temperatures above 850° C.~900° C., it contains primarily the form β $CaSO_4$ anhydrite and doesn't easily undergo hydration with water under standard atmospheric pressure and temperature. As this property influences the usability of fly ash, the inventors continues to research and develop products that meet environmentally friendly standards.

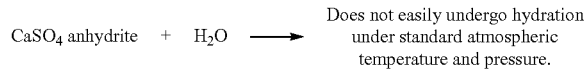

BRIEF SUMMARY OF THE INVENTION

The goal of this invention is to use fly ash from flue gas desulfurization, along with binder reactants and known quantity of water, to make compositions for building materials that have a comparable strength to that cement.

To accomplish this goal, this invention involves mixing fly ash (β CaSO4), obtained from circulating fluidized bed flue gas desulfurization with binder reactants at a ratio of 9:1. It's mainly used for non-structural cement mortar, bricks for paving walkways, brick wall decors, fire-resistant walls for interior partitions, plasterboards and so on. The binder reactants compose of 70% $CaSO_4 \cdot \frac{1}{2}H_2O$, 10% $Na_2SO_4$, 10% CaO, 5% NaOH, 0~5% cement and 0~5% starch. When the binder reactants are mixed with fly ash and water (30% to 40% of the above total weight), the hydration process of $CaSO_4$ anhydrite is accelerated.

DETAILED DESCRIPTION OF THE INVENTION

[Simple Illustration]

To help the review committee better understand the technology, means and effects by which set goals are accomplished, the following case is shown in sequence and illustrated in details to provide deeper perception of the goals, features and advantages of this invention.

[The Way of Implement]

This invention involves mixing fly ash (β $CaSO_4$ anhydrite), obtained from circulating fluidized bed flue gas desulfurization, with binder reactants at a ratio of 9:1. It's mainly used for non-structural cement mortar, bricks for paving walkways, brick wall decors, fire-resistant walls for interior partitions, plasterboards and so on. The binder reactants compose of 70% $CaSO_4 \cdot \frac{1}{2}H_2O$, 10% $Na_2SO_4$, 10% CaO, 5% NaOH, 0~5% cement and 0~5% starch. When the binder reactants are mixed with fly ash and water (30% to 40% of the above total weight), the hydration process of $CaSO_4$ anhydrite is accelerated.

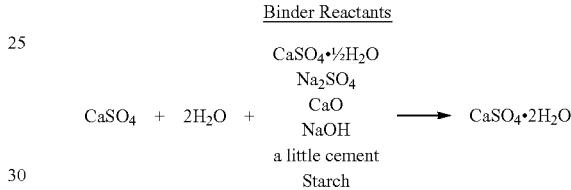

The products are showed in the following:

| Category | Raw Material | Strength (SGS) |
| --- | --- | --- |
| Non-structural Cement Mortar | $CaSO_4$ anhydrite 43% granular $CaSO_4$ 57% | 2500~3000 Lb/in² |
| Bricks for Walkways | $CaSO_4$ anhydrite 43% granular $CaSO_4$ 57% | 2500~3000 Lb/in² |
| Wall decor and plasterboard | $CaSO_4$ anhydrite 100% | 1500~1700 Lb/in² |
| Fire-resistant walls for interior partitions and plasterboards | $CaSO_4$ anhydrite 43% Hydrated $CaSO_4$ 57% | 1000 Lb/in² |

The above products satisfy the demands and standards of normal building materials. Only 10% binder reactant by weight of the above by-products is needed to produce building materials that meet standard construction strength requirement.

From the above procedures, it can be seen that the binder reactant of this invention can accelerate the hydration reaction of the fly ash, which provides a great variety of applications, in contrast to prior art.

The invention has been described in detail with particular reference to certain preferred embodiments thereof and it is intended that the specification and examples be exemplary only. It should be appreciated that variations and modifications can be effected within the spirit and scope of the invention.

What is claimed is:

1. The binder reactant for reusing a calcium sulfate compound, comprising: about 70% $CaSO_4 \cdot \frac{1}{2}H_2O$, about 10% $Na_2SO_4$, about 10% CaO, about 5% NaOH, about 0-5% cement, and about 0-5% starch, wherein said binder reactant is mixed with said calcium sulfate compound for reusing said calcium sulfate compound.

2. The binder reactant of claim 1, wherein the calcium sulfate compound is characterized by a fly ash, wherein said fly ash, obtained from circulating fluidized bed flue gas desulfurization, contains substantially β $CaSO_4$ anhydrite, and wherein said fly ash is mixed with said binder reactant at a ratio about 9:1, thereby a mixture is formed.

3. The binder reactant of claim 2, wherein said mixture is mixed with water with weighted percentage essential between 30% and 40%, whereby a hydration process is accelerated.

\* \* \* \* \*